United States Patent [19]

White

[11] 4,291,680
[45] Sep. 29, 1981

[54] DOUBLE-WALLED GLASS SOLAR ENERGY COLLECTOR

[75] Inventor: Rodney V. White, Sylvania, Ohio

[73] Assignee: Owens-Illinois, Inc., Toledo, Ohio

[21] Appl. No.: 107,218

[22] Filed: Dec. 26, 1979

[51] Int. Cl.³ .............................................. F24J 3/02
[52] U.S. Cl. .................................................. 126/443
[58] Field of Search ........................................ 126/443

[56] References Cited

U.S. PATENT DOCUMENTS

| 980,505 | 1/1911 | Emmet | 126/439 |
|---|---|---|---|
| 1,855,815 | 4/1932 | Abbot | 126/424 |
| 1,946,184 | 2/1934 | Abbot | 126/424 |
| 2,141,330 | 12/1938 | Abbot | 202/180 |
| 2,872,915 | 2/1959 | Bowen | 126/439 |
| 2,906,257 | 9/1959 | Abbot | 126/424 |

FOREIGN PATENT DOCUMENTS 2827082 3/1979 Fed. Rep. of Germany .

*Primary Examiner*—Carroll B. Dority, Jr.
*Assistant Examiner*—Robert J. Marett
*Attorney, Agent, or Firm*—John R. Nelson; Myron E. Click; David H. Wilson

[57] ABSTRACT

This invention provides an improved solar collector of the type employing two concentrically disposed glass tubes having their axial end portions sealingly united to form a double-walled structure, with the annular space between the inner and outer glass tubes being highly evacuated. A heat transfer fluid flows thru the inner tube. The outer surface of the innermost tube is provided with a coating of a solar energy absorbent material to trap energy incident upon the outer tube within the inner tube and the heat transfer fluid. At least one axial section of the inner glass tube is radially inwardly deformed to define a unique bellows configuration to permit absorption of differential thermal expansion of the inner and outer tubes. Improved means for connecting such double-walled tubes in end to end relationship to define a conduit for the heat transfer fluid are also disclosed.

10 Claims, 4 Drawing Figures

DOUBLE-WALLED GLASS SOLAR ENERGY COLLECTOR

BACKGROUND OF THE INVENTION

The recent recognition that the world is rapidly depleting its fossil fuel reserves has inspired much development activity directed toward trapping the energy of the sun and converting it into a form that will help reduce reliance upon fossil fuels as a primary energy source. Many such proposed devices have incorporated glass tubes and particularily, double-walled energy absorbing glass tubes are disclosed in a number of prior art patents wherein two glass tubes are concentrically disposed but radially spaced relative to each other and the axial end portions thereof sealed so that the annular space between the inner and outer glass tubes may be evacuated. An energy absorbing coating is then applied to the external surface of the innermost glass tube and this coating serves to concentrate most of the energy that is incident upon the outer glass tube within the inner glass tube, which energy may be converted to utilitarian purposes by passing a suitable heat transfer fluid through the bore of the inner glass tube.

Typical of these devices are U.S. Pat. Nos.: 980,505 to Emmet, 1,946,184 to Abbot and 2,141,330 to Abbot. While all of these early patents recognized the advantages of a double-walled glass tube having an evacuated annulus as an efficient heat absorber, there was also recognition of the fact that the inherent heating of the inner tube element of the double-walled tube construction resulted in unequal thermal expansion of the inner glass tube relative to the outer glass tube. Hence it was proposed that bellows-type joints or sections be incorporated in the inner glass tube to provide for a means for automatically absorbing the unequal expansion. However, all of the prior art attempts to incorporate an integral bellows configuration in the inner glass tube resulted in a reduction in strength of the inner tube as well as a reduction in the effective diameter of the inner glass tube which, being the primary heat absorbing element, accordingly effected a reduction in the solar heat absorbing efficiency of the resulting double-walled tube.

SUMMARY OF THE INVENTION

Accordingly, it is an object of this invention to provide an improved solar energy absorber in the form of a double-walled glass envelope, including an inner tube coated with a solar energy absorbent material surrounded by an evacuated space, wherein the differential thermal expansion of the inner and outer glass tubes of the sealed double-walled construction is absorbed by an integrally formed bellows section in the inner tube of a unique configuration that does not result in reduction of the strength or effective diameter of the solar energy absorbing inner tube.

This invention contemplates forming an integral bellows configuration in the inner glass tube of a double-walled glass heat absorbing cell by inwardly deforming a limited axial length of the inner glass tube to produce a series of arcuate re-entrant configurations, thereby permitting the resulting bellows to compensate for any differential expansion of the inner glass tube relative to the outer glass tube to which it is integrally united without, however, in any manner reducing the effective diameter or strength of the inner glass tube.

This invention further comtemplates providing an outwardly flared end on each end of the double-walled tube to permit the convenient uniting of such tubes to each other or a fluid conduit in axially aligned relationship through the employment of an elastomeric sleeve surrounding the adjacent outwardly flared portions of the double-walled tubes which is clamped into sealing engagement therewith by any form of conventional clamp. By providing an integral mounting pad portion on the clamp which is slidable relative to a support rail, the clamp elements may also be utilized to support an assembled array of double-walled solar energy absorbing tubes incorporating this invention.

DESCRIPTION OF PREFERRED EMBODIMENTS

Figure 1:
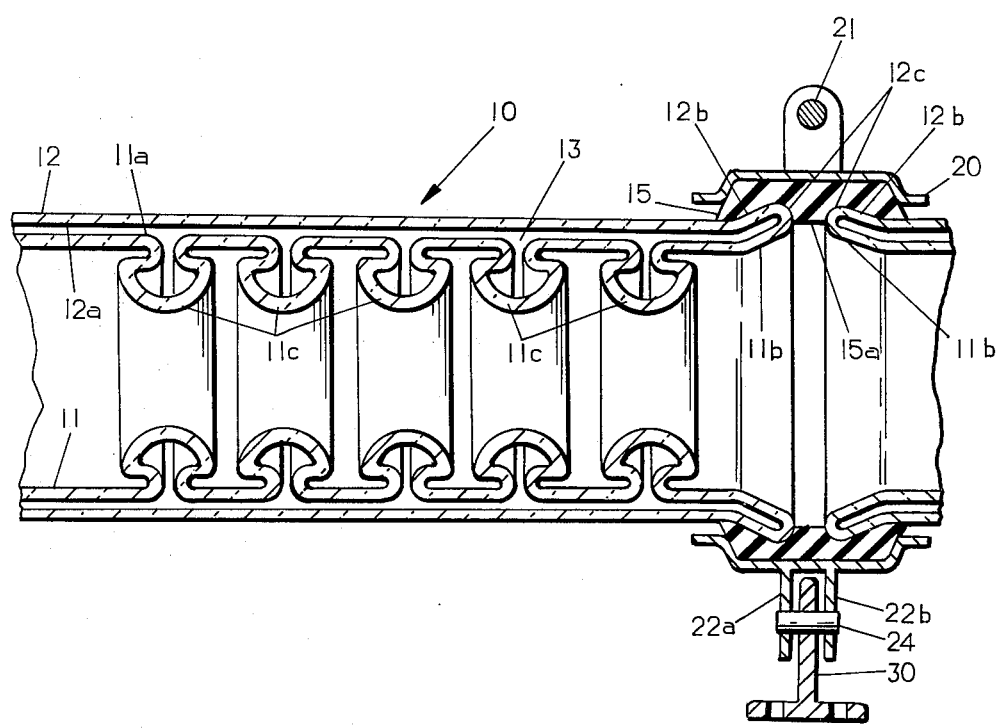
FIG. 1 is a sectional view taken through two adjacent axial portions of two double-walled glass solar energy absorbing cells constructed in accordance with this invention, which are united by a clamping arrangement embodying this invention.
Figure 2:
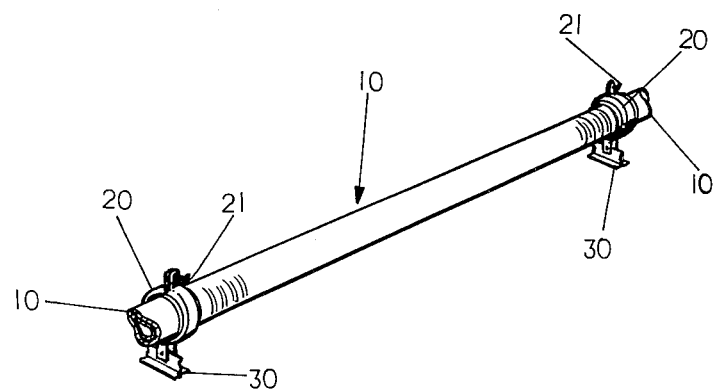
FIG. 2 is a reduced scale perspective view illustrating the manner in which the double-walled tubes of FIG. 1 may be mounted on a pair of support rails.

Referring to FIG. 1 of the drawings, the numeral 10 schematically indicates a double-walled solar energy absorbing tube embodying this invention. Tube 10 comprises an inner glass tube 11 concentrically disposed within an outer transparent glass tube 12. The outer surface 11a of the inner tube is coated with any one of several well known solar energy absorbing coatings which, when solar radiation is incident on the transparent outer tube 12, is absorbed by such coating and substantially all of such energy retained within the walls and the interior of the inner tube 11. A heat transfer fluid is normally pumped through the interior of the tube 11 in order to transfer the absorbed energy to an energy consuming device.

As is conventional, each axial end of 11b and 12b of the inner tube 11 and outer tube 12 are sealed together in any suitable fashion, as by heating the end portions of such tubes to a flowable condition and causing them to move into abutting and hence sealed engagement. During or subsequent to the end sealing operation, the annular space 13 defined between the external surface 11a of the inner tube 11 and the internal surface 12a of the outer tube 12 is connected to a high vacuum pump and evacuated in a conventional manner to a level on the order of $2 \times 10 - 5$ torr. As is well known, the evacuated annulus 13 provides insulation of the inner tube 11 and protects the solar energy absorbent coating from oxidation.

As is well known, the inner glass tube 11 will be heated to a substantially higher temperature than the outer tube 12 by incident solar radiation. Temperature differences on the order of 600° F. may readily be encountered. Since the inner tube 11 and the outer tube 12 are integrally united by the sealing of the axial end portions 11b and 12b, it is apparent that compensating means must be provided to permit the inner glass tube to expand to a greater degree than the outer glass tube 12 in order to avoid breakage of the integral double-walled tube structure.

In accordance with this invention, an axial length of the inner tube 11 is deformed inwardly into a bellows-shaped configuration illustrated in FIG. 1. Essentially a length of the wall of tube 11 is heated to the softening point and then rotated, successive portions of the heated wall are moved inwardly by the application of a suitable tool, and then axially compressed to define a plurality of re-entrant arcuate configurations 11c. The configurations 11c could also be described as essentially torodial. The number of such deformations will, of course, be a function of the length of the double-walled tube 10 and the anticipated temperature differential, but normally 4 to 12 of such inward bellow-shaped deformations 11c will be formed in a four foot length of tube 11.

It will be noted that the wall thickness of the inwardly deformed portions 11c remains essentially the same as the wall thickness of the original tube 11. Moreover, while in the particular example illustrated in the drawings, all of the bellow-shaped deformations are grouped adjacent one axial end of the tube 11, obviously, they may be positioned anywhere along the length of the tube. It will further be noted that due to the re-entrant configuration of the inwardly deformed portions 11c, the original diameter of tube 11 is maintained between the adjacent deformations. The energy absorbing coating is thus substantially continuous. It follows that the provision of the inward re-entrant arcuate deformations 11c does not substantially impair the solar energy absorbing characteristics of that portion of the tube 11.

This particular construction of the inner tube 11 differs from the prior art in that all of the bellows deformations extend inwardly from the diameter of inner tube 11. This necessarily means that the maximum diameter of the tube 11 is dictated solely by the width desired for the annular evacuated space 13. The ratio of the outer diameter of inner tube 11 to the inner diameter of the outer tube 12 should not be less than 85%. In contrast, in prior art structures, the bellows arrangements were always outwardly deformed, and were generally produced by a blowing operation resulting in a thinning of the wall sections. Thus not only was the effective diameter of the major portion of the inner glass tube significantly reduced, but at the same time the physical strength of the inner glass tube was reduced through the incorporation of the outwardly blown bellows configuration.

Whenever it is desired to utilize the double-walled tubes 10 constructed in accordance with this invention in an assemblage of tubes on a surface exposed to solar radiation, such as a southerly-facing roof surface, it is desirable that successive tubes be quickly and conveniently coupled in fluid-sealed relationship relative to each other. Such coupling may be conveniently accomplished by the apparatus shown in FIG. 1. For example, the sealed end portions 11b and 12b of the inner and outer glass tubes are provided with an outwardly directed flare 12c during the sealing operation. These outwardly flared portions 12c are then surrounded by an annulus or sleeve 15 of elastomeric material which has an internally projecting rib 15a disposed between the adjacent end surfaces of the adjacent tubes 10 to insure that no physical contact of the tube ends occurs. The elastomeric sleeve 15 is then clamped into fluid-sealing and mechanical-holding engagement with the two adjacent double-walled tubes 10 by conventional metallic clamp element 20 having a clamp-tightening screw 21. This type of clamp is commonly employed in the plumbing field and hence has not been illustrated in detail. Elastomeric sleeve 15 also provides heat insulation for the ends of tubes 10.

Clamp 20 may, however, be provided with an integral pair of laterally spaced depending mounting pads 22a and 22b. Pads 22a and 22b may then be conveniently mounted at any selected place on an inverted T-shaped supporting rail 30 which is secured to a roof or similar surface exposed to solar radiation. The particular location of the clamp 20 relative to the T-shaped rail 30 may be selected by passing a pin 24 through the pads 22a, 22b and a hole (not shown) provided in the upstanding leg of the inverted T-shaped rail 30.

Figure 3:
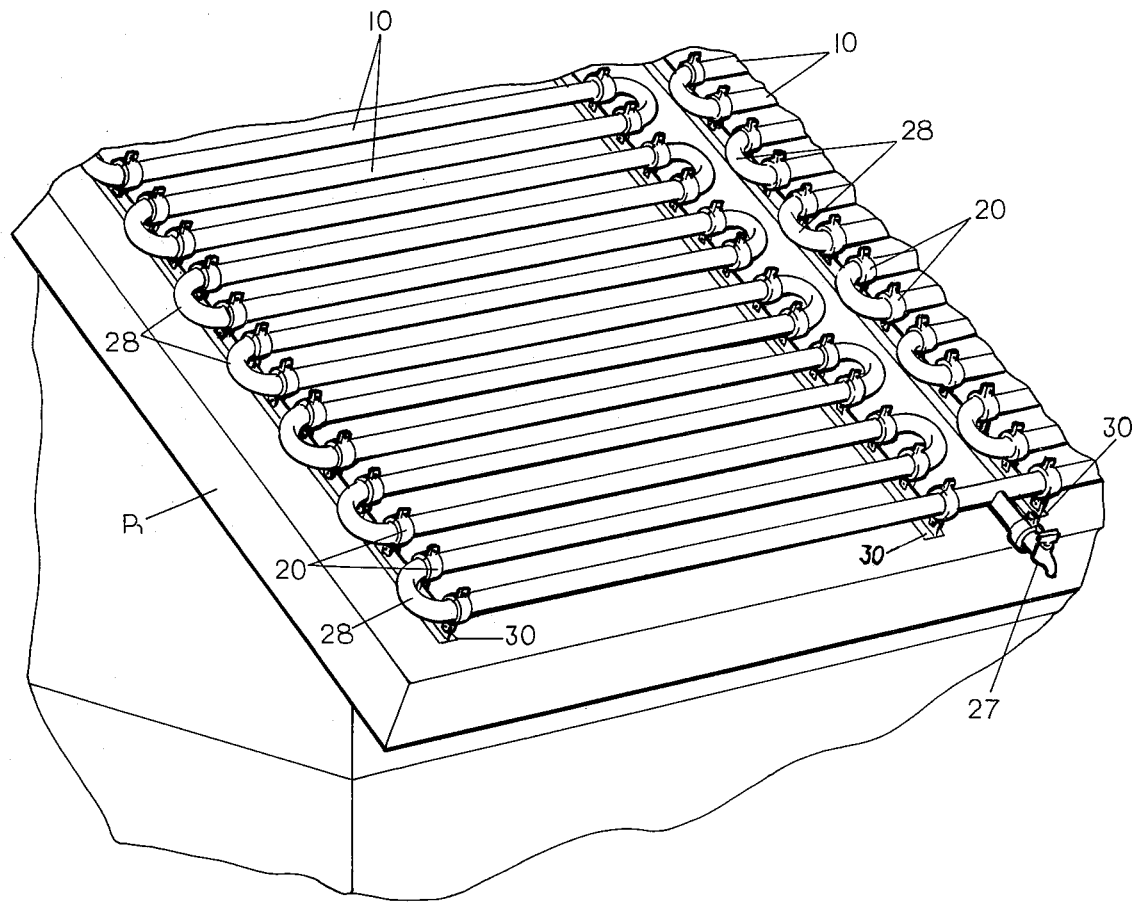
FIG. 3 is a perspective view of an installation of solar energy absorbing tubes embodying this invention with the tubes being disposed in horizontal relationship on a sloped roof surface.
Figure 4:
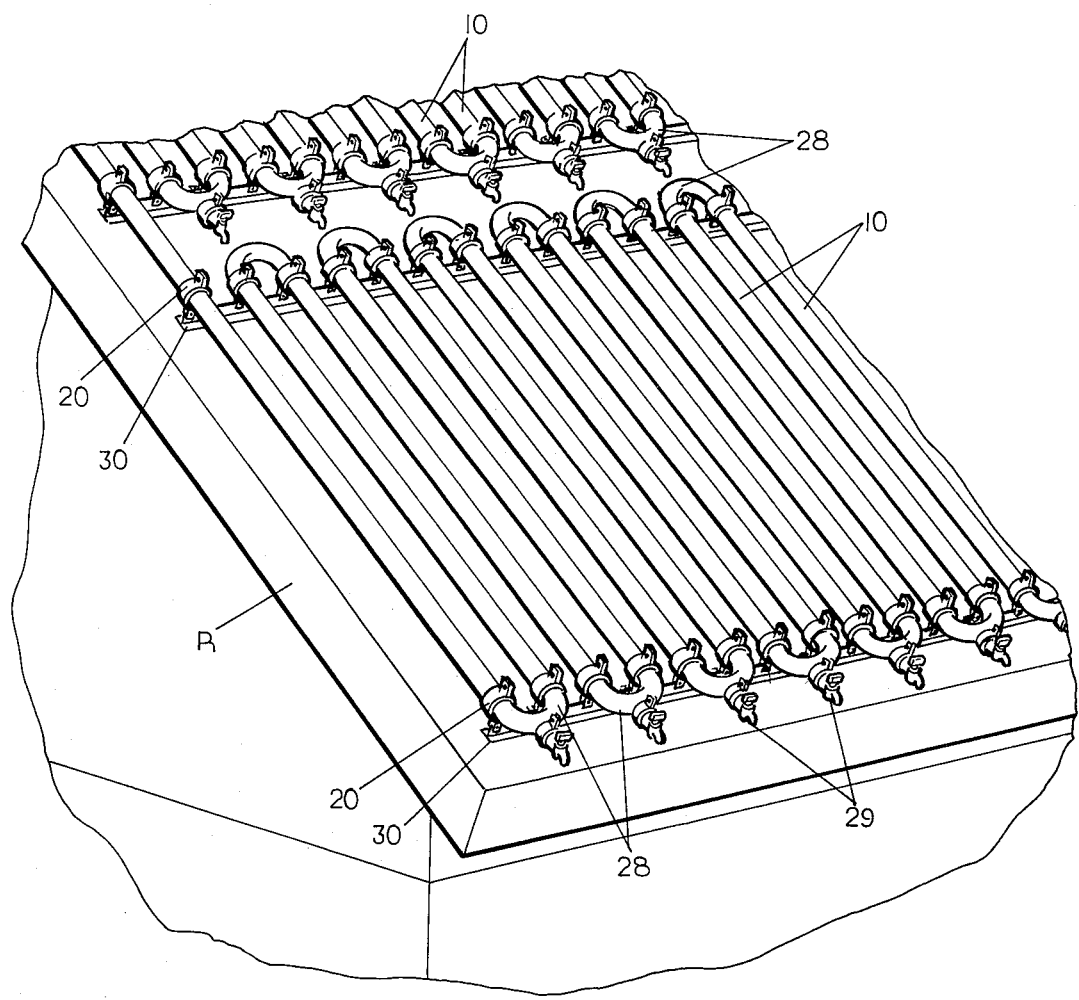
FIG. 4 is a view similar to FIG. 3 but showing the tubes arranged in a generally vertical relationship with respect to a sloped roof surface.

Referring now to FIGS. 3 and 4, there are shown two typical installations of solar energy absorbing tubes embodying this invention. Referring first to FIG. 3, the rails 30 are mounted in generally vertically extending relationship on an inclined roof R of a house or similar structure exposed to solar radiation. In this particular example, two such rails 30 are disposed in parallel relationship. and respectively support clamps 20 which engage the ends of double-walled tubes 10. The clamps 20 also clamp a U-shaped connecting tube 28 to the ends of the adjacent horizontally disposed double-walled tubes 10. Of course the ends of the continuous fluid conduit thus defined by the assemblage are respectively connected to the inlet and outlet ends of an energy consuming apparatus (not shown). A drain outlet 27 may be provided.

As will be recognized by those skilled in the art, all of the connections, such as U tubes 28, will be covered by an appropriate molding (not shown) of insulating material.

Referring now to FIG. 4, the configuration illustrated mounts the rails 30 in a horizontal position on the inclined roof structure 40. The tubes 10 are in a generally vertical position and are successively inter-connected by U-shaped connectors 28 through the employment of clamps 20. In order to insure drainage of this structure to prevent freeezing of the heat transfer fluid, drain faucets 29 may be provided on the mid-section of each of the lower connecting loops 28.

Although the invention has been described in terms of specified embodiments which are set forth in detail, it should be understood that this is by illustration only and that the invention is not necessarily limited thereto, since alternative embodiments will become apparent to those skilled in the art in view of the disclosure.

What is claimed is:

1. A solar energy collector comprising, in combination, a transparent outer glass tube, an inner glass tube concentrically inserted in said outer tube with an annular space defined between the outer wall of the inner tube and the inner wall of the outer tube, means for sealing the axial ends of said tubes together to permit evacuating the said annular space, means for flowing a heat transfer fluid thru the inner glass tube, a solar energy absorbent coating on the outer wall of said inner glass tube, thereby trapping solar energy incident on said outer tube within said heat transfer fluid and said inner glass tube, said inner glass tube having at least one axial portion of its length deformed inwardly to form a bellows-shaped expansion section to absorb differences in expansion of said inner and outer tubes, said bellows-shaped section having the same outer diameter as said inner tube and the outer diameter of the inner tube being at least 85% of the inner diameter of the outer tube.

2. The apparatus of claim 1 wherein said inwardly deformed portion is of re-entrant arcuate configuration and has a wall thickness at least equal to the non-deformed portions of said inner glass tube.

3. In a solar energy collector of the type having a pair of concentrically disposed glass tubes sealed together at their opposed axial ends to define an enclosed annular space therebetween, said annular space being highly evacuated and the outer surface of the inner tube being covered with a solar energy absorbent coating to trap solar energy incident on the outer tube within said inner tube, the improvement comprising at least one axial portion of said inner tube being deformed inwardly to form a bellows-shaped expansion section, each said bellows-shaped section being essentially torodial and having the same outer diameter as the inner tube and being effective to absorb differences in thermal expansion of said integrally united inner and outer glass tubes.

4. The apparatus of claim 3 wherein said inwardly deformed portion has a wall thickness at least equal to the non-deformed portions of said inner glass tube.

5. The combination defined in claim 1 wherein said means for flowing a heat transfer fluid through the inner glass tube comprises an outwardly flared end portion on said outer glass tube, a fluid conduit having a similarly outwardly flared end portion disposed adjacent the said outwardly flared end portion of said outer glass tube, a sleeve of elastomeric material snugly surrounding both said outwardly flared portions, and an adjustable clamp surrounding said sleeve and compressing same into fluid-sealing and mechanically-connecting engagement with said outer glass tube and said adjacent fluid conduit.

6. The apparatus defined in claim 5 wherein said adjustable clamping element is provided with a mounting flange adapted for detachable securement to a support rail.

7. The apparatus defined in claim 5 wherein said fluid conduit comprises another solar energy collector.

8. A tubular solar collector comprising a first glass tube open at its opposite axial ends, and a second glass tube whose I.D. is slightly greater than the O.D. of said first tube, said first tube having integral, inwardly directed, annular, axially extending bellows segments formed in the tube wall near one of its open ends, an opaque solar energy absorbing annular coating layer extending over a substantial axial portion of the outermost surface areas of said first tube, said second tube being transparent and having its opposite open ends fusion sealed with glass of said first tube at axially spaced points therealong, said opposite end seals providing an evacuated chamber between the first and second glass tubes.

9. The solar collector of claim 8 wherein each bellows segment is of a substantially toroidal configuration.

10. The collector of claim 8 or 9 which includes a plurality of tubular collectors and means including an elastomeric sleeve connecting one open end of the first glass tube of one of the collectors to an open end of the first glass tube of another of the tubular collectors, said means providing for flow of a heat exchange medium successively through each first glass tube of the plural collectors and preventing substantial heat loss from heated medium therein.

* * * * *